United States Patent Office 3,193,573
Patented July 6, 1965

---

3,193,573
2,2,2-TRICHLOROETHYLCARBONATE
Henry C. Caldwell, Elkins Park, Pa., assignor to Smith Kline & French Laboratories, Philadelphia, Pa., a corporation of Pennsylvania
No Drawing. Filed Apr. 25, 1962, Ser. No. 189,989
1 Claim. (Cl. 260—463)

This invention relates to 2,2,2-trichloroethylcarbonate of the following structural formula:

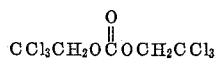

This novel compound exhibits central nervous system depressant activity when internally administered to mammals and thus has specific utility as a hypnotic and sedative.

The central nervous system depression produced by 2,2,2-trichloroethylcarbonate is measured quantitatively as a decrease in spontaneous motor activity of mice in a light box apparatus. In this apparatus, spontaneous motor activity is measured by the number of times an animal interrupts light beams within a selected interval of time. An electric counting device automatically registers one count each time a light beam is broken. The number of counts is a measure of the spontaneous motor activity.

The observed pharmacodynamic activity of 2,2,2-trichloroethylcarbonate makes it useful as a substitute for trichloroethanol. The latter compound is recognized as a hypnotic and sedative. The similarity in activities of 2,2,2-trichloroethylcarbonate and trichloroethanol may be explained by the occurrence of an in vivo hydrolysis of the carbonate to the alcohol as follows:

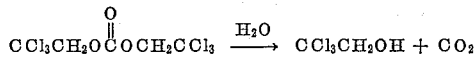

Thus it has been found that, on a milligram for milligram basis, 2,2,2-trichloroethylcarbonate and trichloroethanol are equipotent in depressing the central nervous system (as measured by spontaneous motor activity) and equitoxic.

There are many advantages of 2,2,2-trichloroethylcarbonate which make it preferable to trichloroethanol. For example, (a) the carbonate is a tasteless solid which can be tabletted or encapsulated, whereas the alcohol is a hygroscopic liquid and (b) the carbonate is insoluble in water which tends to lessen the gastric irritation produced by the water-soluble alcohol. The property of poor water-solubility slows down the onset of action for 2,2,2-trichloroethylcarbonate but results in a longer period of sustained action.

2,2,2-trichloroethylcarbonate is prepared as follows. To a solution of 20 ml. of phosgene in 100 ml. of toluene is added slowly with stirring and cooling a mixture of 74.7 g. of trichloroethanol and 39.6 g. of pyridine. The mixture is stirred for three hours at room temperature. The excess phosgene is removed and the pyridine hydrochloride filtered. The filtrate is washed with 10% sodium hydroxide solution, dried and concentrated. Dilution with hexane yields the solid 2,2,2-trichloroethylcarbonate, M.P. 86–87° C.

The 2,2,2-trichloroethylcarbonate of this invention is advantageously employed in combination with a pharmaceutical carrier. A solid carrier is preferred, for example talc, cornstarch, lactose, ethylcellulose, magnesium stearate, agar, pectin, stearic acid, gelatin and acacia. A variety of solid pharmaceutical forms can be employed, preferably tablets or capsules.

Compositions comprising 2,2,2-trichloroethylcarbonate and a pharmaceutical carrier are administered internally to mammals, preferably orally, and contain an amount of the carbonate sufficient to produce a hypnotic or sedative effect. Dosage units are usually administered on a daily divided dosage regimen.

What is claimed is:
A chemical compound of the formula:

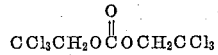

References Cited by the Examiner
UNITED STATES PATENTS 2,959,611 11/60 Nelson et al. _____ 260—463
3,047,374 7/62 Condo _____ 260—463 X

OTHER REFERENCES

Carli et al., Chem. Abs., vol. 31, pp. 7396–7 (1937).

CHARLES B. PARKER, *Primary Examiner.*
JOSEPH P. BRUST, *Examiner.*